A. A. MARTELL.
DEVICE FOR ALINING AND FINISHING SHAFT BEARINGS AND THE LIKE.
APPLICATION FILED SEPT. 28, 1915.
1,382,842.
Patented June 28, 1921.
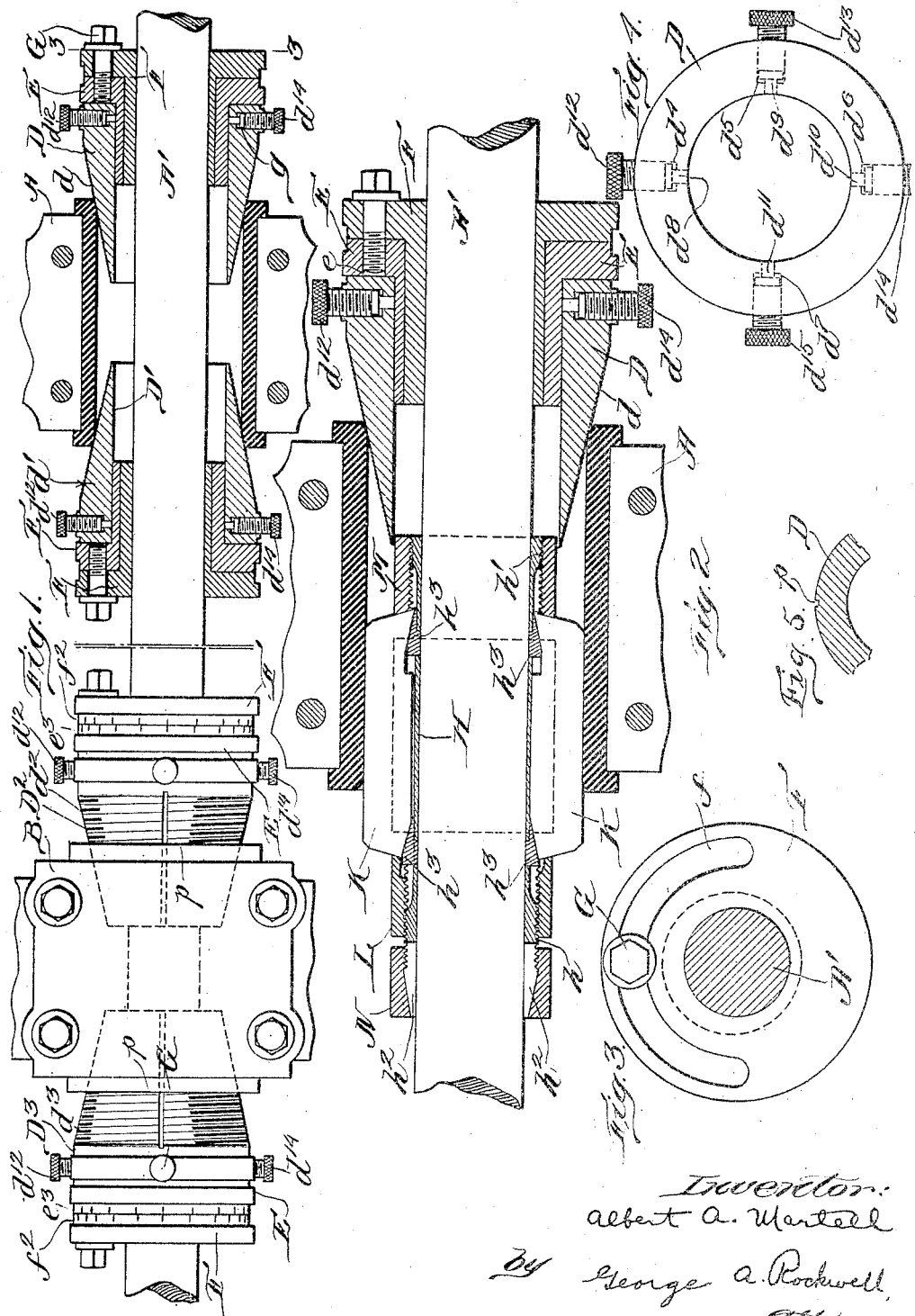

UNITED STATES PATENT OFFICE.

ALBERT A. MARTELL, OF MANSFIELD, MASSACHUSETTS, ASSIGNOR TO THE TAFT-PEIRCE MANUFACTURING COMPANY, OF WOONSOCKET, RHODE ISLAND, A CORPORATION OF RHODE ISLAND.

DEVICE FOR ALINING AND FINISHING SHAFT-BEARINGS AND THE LIKE.

1,382,842. Specification of Letters Patent. Patented June 28, 1921.

Application filed September 28, 1915. Serial No. 53,119.

*To all whom it may concern:*

Be it known that I, ALBERT A. MARTELL, of Mansfield, in the county of Bristol and State of Massachusetts, having invented a new and useful Device for Alining and Finishing Shaft-Bearings and the like, of which the following is a specification.

My invention relates to devices of the kind disclosed in my Patent No. 1,135,460 dated April 13, 1915.

I have found that in some cases it is desirable to have means, other than a frictional means as disclosed in said patent, to hold the conical member in position with relation to the permanent bearing while the tool is operating in order to get the most perfect results and my invention consists partly in providing such means and in the preferred form consists in a screw thread on the conical member, which screw thread, being of metal which is relatively hard as compared with the permanent bearing, will be held to said bearing and cut its own thread therein.

Another feature of my invention consists in means for holding the conical member to the adjacent sleeve, these means having also the function of aiding in rotating the conical member so that its threads will engage the permanent bearing and hold the conical member in place.

In the drawings:

Figure 1 is an elevation partly in section illustrating the temporary bearings;

Fig. 2 is a section on a larger scale illustrating my device in use;

Fig. 3 is a section on line 3—3 of Fig. 1; and

Fig. 4 is an end view of the conical member.

Fig. 5 is a fragmentary view of the groove.

I disclose my invention as embodied in a tool for reaming the bearings of a crankshaft of an automobile engine, but my tool may be used for a great variety of purposes.

A and B represent two of the bearings of a crank-shaft although there may be more such bearings in line. D, D', D² and D³ represent bushings whose exterior surfaces are conical and threaded at $d$, $d'$, $d^2$ and $d^3$ to engage the permanent bearing to be reamed. Fitting within each of the bushings is flanged sleeve E having threaded hole $e$. Fitting within sleeve E is another flanged sleeve F having semi-circular slot $f$. Screw G passes through slot $f$ and engages the threading in hole $e$, this screw holding the two sleeves in their proper position when finally adjusted.

Four threaded holes $d^4$, $d^5$, $d^6$ and $d^7$ are provided in each of members D, D', D² and D³ and at the bottom of these holes are headed plungers $d^8$, $d^9$ $d^{10}$ and $d^{11}$ which are pressed inwardly by screws $d^{12}$, $d^{13}$, $d^{14}$ and $d^{15}$ which engage the threads of holes $d^4$, $d^5$, $d^6$ and $d^7$. The pressure in these plungers causes them to frictionally engage the outer surface of sleeve E to hold the bushing D and sleeve E in proper relative position. The heads of the screws project from the bushing so that they may be used to rotate the bushings to cause the thread of the latter to engage the permanent bearing which is of relatively soft material compared to the material of the bushing.

Of course the bushing may be rotated without using the screw heads and the thread of the bushing will cut a thread on the permanent bearing and thus positively hold the bushing to the permanent bearing particularly during the reaming.

The inner sleeve has a scale at $f^2$ consisting of, for example, 20 graduations, while sleeve E has scale portion $e^3$ having, for example, 19 graduations so that relative movement of these scale portions which brings graduation 1 on one scale opposite graduation 1 on the other will indicate that movement of say one-thousandth of an inch will have been given to the shaft as hereinafter pointed out.

It will be noted that the exterior of member F is eccentric to its interior which fits shaft A' and that the interior of member E is eccentric to its exterior and these eccentricities are preferably about equal. The interior and exterior surfaces of the bushing are, as desired, concentric or eccentric with shaft A'.

When the shaft has been properly positioned or alined the reaming tool is applied and this consists in the shank H threaded at $h$ and $h'$ and carrying the blades K. The blades K are mounted to move along wedge members $h^3$ mounted in the shank H.

Nuts L and M are interiorly threaded to engage threaded portions $h$ $h'$ and engage the blades to hold them in position.

Clamping nut N may be used to clamp the shank to the shaft, the shank being split at several places $h^2$ for this purpose.

The shaft A' is non-concentric with the outer surface of sleeve F and this provides what is in effect a wedge action when the sleeve or sleeves are rotated in order to force the axis of the shaft into the desired position.

In using my device I place one of the temporary bearings including the sleeves and the bushings D and $D^3$ on each end of the shaft and then insert the bushings within the bearings as accurately as may be convenient. I then rotate the two sleeves of each temporary bearing within their bushing with such movement with relation to each other as may be required from the two working points, such for example, as the cylinders and the gear shaft or shafts. If the eccentricity of the center of the shaft and the center of the inner sleeve is, for example, three-sixty-fourths of an inch, the center of the shaft may be positioned at any point within the circumference of a circle having a diameter of three-thirty-seconds of an inch. I then adjust the bearing having bushing D' and this may be done with sufficient accuracy by starting with the two zeros of adjacent scales opposite each other and then turning one or both of the sleeves until the inner sleeve binds against the shaft. This might show on the scale a variation of three scale graduations in which case I turn the sleeve back about half of the distance covered in the forward rotation. This divides any slight inaccuracy and is sufficiently accurate for this bearing and this same thing is done with the bearing having bushing $D^2$. When the shaft has been thus accurately positioned it is partially withdrawn and one of the temporary bearings such as that with the bushing D' is removed. The reaming tool is applied to the shaft and brought into position for reaming. When the bearing has been reamed to the extent shown in Fig. 2 the bearing having bushing D is removed and the reamer, having itself now become properly centered, will continue the reaming until the whole bearing is finished. Any suitable means may be provided for rotating the reamer. When one bearing has been finished the temporary bearings may be re-inserted and the other bearing or bearings may be finished in similar fashion.

The grooves $p$ on the surface of the conical bushing aid in forming the thread on the permanent bearing especially when the metal of the permanent bearing is made of hard composition. These grooves provide what is, in effect, a cutting edge, and are narrow in width and shallow in depth so that they will not interfere to any appreciable effect with the holding function, and these grooves form an important feature of my invention. These grooves are preferably symmetrically arranged to equalize pressure and four are shown as the preferred form.

What I claim is:

1. A temporary bearing comprising a member having a plurality of threaded holes; a set screw for each hole and threaded to engage the thread of said hole; a plunger operative in each of said holes; a second member rotatably mounted in the first member and held in position by said plungers and a third member rotatably mounted in the second member and having a bore eccentrically disposed with relation to the exterior of said third member.

2. A temporary bearing including a member adapted for connection to a permanent bearing and carrying a plunger and a set screw to operate the plunger; and a second member rotatably mounted in the first member and held in position by said plunger, said second member having its bore eccentric to the bore of the first member.

3. A temporary bearing comprising a member having a threaded hole; a set screw for said hole and threaded to engage the thread of said hole; a plunger operative in said hole; a second member rotatably mounted in the first member and held in position by said plunger; and a third member rotatably mounted in the second member and having a bore eccentrically disposed with relation to the exterior of said third member.

4. As an article of manufacture a temporary bearing for temporarily carrying a shaft through permanent bearings, said temporary bearing comprising a conical member, screw threads on said conical member and adapted to bite into the end of a suitable permanent bearing, a shaft bearing carried by said conical member, and means for adjusting the axis of said shaft bearing relatively to the axis of said conical member.

5. As an article of manufacture a support for a temporary bearing adapted to be secured in a permanent bearing, said support comprising a conical faced member, slow pitched screw threads upon the face of said conical member whereby when said member is started into a substantially cylindrical permanent bearing and when rotated therein a sufficient number of said threads will bite into said permanent bearing to securely fasten said member in position in said permanent bearing, and means comprising hand holds to facilitate rotating the said member.

6. In a device of the character described a temporary bearing for a reamer shaft for reaming permanent bearings, comprising a reamer shaft bearing, a conical sleeve adapted to be inserted in a permanent bearing, said conical sleeve having a bore concentric with the axis of the conical face, means rotatable in said bore and supporting said reamer shaft bearing, and opposed friction clamps adapted to clamp said means within said sleeve and without disturbing the set of the sleeve in the permanent bearing.

7. As an article of manufacture, a temporary bearing comprising a member adapted to be inserted in a permanent bearing, a work-shaft bearing carried by said temporary bearing, means to permit said work-shaft bearing to be adjusted relatively to the axis of said member, and positively engaging means for securely attaching the said member to a permanent bearing to be reamed.

8. An article of manufacture comprising a temporary bearing member adapted to be inserted in a permanent bearing and comprising a completely rotatable conical bushing, a work-shaft bearing, clamping devices between said conical member and said work-shaft bearing whereby said work-shaft bearing may be clamped in any rotated position relatively to said conical member, and means whereby the axis of said work-shaft bearing is adjustable relatively to the axis of the conical member.

9. A temporary bearing adapted for connection with a permanent bearing and comprising a member provided with a cylindrical sleeve having a work-shaft bearing therein with the axis of the work-shaft bearing eccentric to the exterior of the sleeve; another sleeve provided with an eccentric bore and being mounted upon the first mentioned sleeve, means to permit a limited rotation between said sleeves, a conical member provided with a cylindrical bore adapted to receive said second mentioned sleeve and to be fully rotatable thereon, and devices for clamping said conical member in any rotated position relatively to said second mentioned sleeve.

10. A device of the character specified comprising a work-shaft bearing, an adjustable support for said work-shaft bearing, a conical sleeve adapted to be completely rotated on said support, cutting screw threads formed upon said conical sleeve and adapted to bite into the end of a suitable permanent bearing, and means for clamping said conical sleeve in any rotated position relatively to said support.

11. In a device of the character specified consisting of a temporary bearing adapted to be set in a permanent bearing and comprising the combination of a work-shaft bearing, a member to adjustably support said work-shaft bearing, and positively engaging means for securing said member relatively to a permanent bearing, whereby the axis of the work-shaft bearing may be set to a predetermined axis independently of the axis of the permanent bearing.

12. A device of the class described, a reamer shaft, a reamer on said shaft, a temporary bearing slidable longitudinally on said reamer shaft in combination with a conical faced member to support said reamer shaft within a permanent bearing, positively engaging means between said conical member and said permanent bearing, and hand holds whereby said conical faced member may be rotated to cause said positively engaging means to rigidly secure said conical member within said permanent bearing.

ALBERT A. MARTELL.